(12) United States Patent
Bugovics

(10) Patent No.: US 8,127,344 B2
(45) Date of Patent: Feb. 28, 2012

(54) RAPID ARCHIVABLE WORM MEMORY SYSTEM BASED ON A HARD DISC

(75) Inventor: Jozsef Bugovics, Zweimen OT Dölkau (DE)

(73) Assignee: iTernity GmbH, Freiburg (DE)

( * ) Notice: Subject to any disclaimer, the term of this patent is extended or adjusted under 35 U.S.C. 154(b) by 891 days.

(21) Appl. No.: 11/572,151

(22) PCT Filed: Jul. 21, 2004

(86) PCT No.: PCT/DE2004/001595
§ 371 (c)(1),
(2), (4) Date: Jan. 16, 2007

(87) PCT Pub. No.: WO2006/010347
PCT Pub. Date: Feb. 2, 2006

(65) Prior Publication Data
US 2007/0219948 A1    Sep. 20, 2007

(51) Int. Cl.
*G06F 21/00*    (2006.01)
(52) U.S. Cl. .......................................... 726/7; 713/193
(58) Field of Classification Search ................ 707/1–5; 726/7; 713/193
See application file for complete search history.

(56) References Cited

U.S. PATENT DOCUMENTS

| | | | | |
|---|---|---|---|---|
| 5,526,362 A | * | 6/1996 | Thompson et al. | 370/516 |
| 5,761,669 A | * | 6/1998 | Montague et al. | 707/103 R |
| 5,983,295 A | * | 11/1999 | Cotugno | 710/74 |
| 6,092,023 A | * | 7/2000 | Kunishige | 702/1 |
| 6,185,661 B1 | | 2/2001 | Ofek et al. | |
| 7,020,843 B2 | * | 3/2006 | Hamlett et al. | 715/760 |
| 2001/0054115 A1 | * | 12/2001 | Ferguson et al. | 709/248 |
| 2002/0138735 A1 | * | 9/2002 | Felt et al. | 713/176 |
| 2003/0005181 A1 | * | 1/2003 | Bau et al. | 709/330 |
| 2003/0097564 A1 | * | 5/2003 | Tewari et al. | 713/171 |
| 2004/0177058 A1 | * | 9/2004 | Carpentier et al. | 707/1 |
| 2005/0015624 A1 | * | 1/2005 | Ginter et al. | 713/201 |

FOREIGN PATENT DOCUMENTS

WO    01/18633    3/2001

OTHER PUBLICATIONS

Schneier, "Applied Crytography", 1996, Wiley and Sons, Second Edition pp. 75-78.*

(Continued)

*Primary Examiner* — Edan Orgad
*Assistant Examiner* — Brian Olion
(74) *Attorney, Agent, or Firm* — Michael J. Striker

(57) ABSTRACT

A process is described which permits particularly rapid writing and reading of small files, such as e-mails and scanned documents, for legally relevant WORM data storage which preserves evidential integrity. The process is implemented using currently available operating systems and standard hardware, wherein the disadvantages of these operating systems in the processing of many small files and the insecurity of the data storage are overcome by the architecture of the hardware and the implementation of the process.

In accordance with the invention there are on a first hard disc (4) an operating system (5) and also WORM server software (6) with an API (12), a second hard disc (7) serves as a work area and cache, wherein the secured data are loaded onto mass memory units (11) in content storage containers (CSCs), using the WORM server software (6) access rights are configured, CSCs are loaded, the number of files is reduced and secure storage is carried out.

12 Claims, 1 Drawing Sheet

OTHER PUBLICATIONS

Karl Froehlich: "Worm-Storage: Festplatten Als Archivmedium" Speicherguide.DE Online, Apr. 21, 2004. http://www.speicherguide.DE/magazin/pop_print_artikel.

Network Appliance, Inv.: "Snaplock Compliance and Snaplock Enterprise Software" Online, Jul. 20, 2004, http://www.netapp.com/FTP/snaplock.PDF. (In English).

* cited by examiner

RAPID ARCHIVABLE WORM MEMORY SYSTEM BASED ON A HARD DISC

CROSS-REFERENCE TO RELATED APPLICATION

The invention described and claimed hereinbelow is also described in International Patent Application PCT/DE 2004 001 595 filed on Jul. 21, 2004. This International Patent Application, whose subject matter is incorporated here by reference, provides the basis for a claim of priority of invention under 35 U.S.C. 119(a)-(d).

BACKGROUND OF THE INVENTION

The invention relates to a system for secure and rapid storage of digital contents on electronic mass memory with particular consideration being given to the fact that the storage process should preferably be applied to legally relevant information which can be written only once but may be read many times (WORM).

The legally secure storage of data is becoming ever more important in our society since an increasing amount of correspondence is being generated which is not committed to paper and therefore it is no longer possible to present a legal case solely on paper. Paper-based data media are often also stored digitally for archiving purposes because it is not really possible to search for, and store, paper documents efficiently. In such processes large quantities of relatively small data records are built up, such as about 50-100 KB for one page of paper. These must be stored in accordance with legal provisions in a reliable and tamper-proof manner for up to 30 years.

The storage of data has thus far frequently been effected on so-called WORM tapes or optical WORM CDs. These magneto-optical storage media can be written to only once but may be read many times if desired. The disadvantage of these media is the limited storage space on the CD or the tape. In order to get around this problem mechanical systems Oukeboxes) were introduced which change the memory media in the read-write apparatus. However, since the writing and reading speed of these media is relative low, systems have increasingly become established which preconnect a more rapid hard disc memory as a cache system. However, in this case considerable costs and the mechanical susceptibility of the actual systems to the reading and storage of the data still remain. In the recent past there has therefore been a transition to the use of redundant hard disc memories in association with intelligent software. The software secures the WORM property of the hardware which can actually be re-written at any time. This securing process is usually effected through a software-based writing blockade on already written files. A corresponding process is disclosed in, amongst others, the document U.S. Pat. No. 6,185,661 in which a control program in the system cache receives a write request, checks whether the write request is directed at a memory area for reading and writing or for reading only, wherein then as a result of the check only requests for write/read tracks are implemented.

Since software is not protected against modification and deliberate attack, particular security demands are placed on such a system. At the same time, existing operating systems are used which, by definition, are inherently insecure and have not been optimised for the mass storage of small files. The actually rapid hard disc memories are therefore often also slow when it comes to the writing and reading of many small files, depending on the application the security systems are also unable to withstand a potentially hostile attack on the system. Subsequent change to, or falsification of, the data is possible without it being possible to prove or unravel such a process. The development of dedicated secure operating systems proves to be very complex and would make the resulting end product substantially more expensive for large sectors of consumers.

SUMMARY OF THE INVENTION

It is the object of the invention to create a process from the combination of software and hardware which permits particularly rapid writing and reading of small files, such as e-mails and scanned documents, for legally relevant WORM data storage which preserves evidential integrity (is archivable). In particular, the process should be able to be implemented using currently available operating systems and standard hardware, wherein the disadvantages of these operating systems in the processing of many small files and the insecurity of the data storage should be avoided by the architecture of the hardware and the execution of the process.

The process in accordance with the invention is effected using a fundamentally known hardware configuration with a CPU having one or a plurality of processors and the usual necessary hardware elements of a PC with a bus system between the CPU and a first RAID controller which is connected to a mass memory in the form of a first hard disc on which an operating system and WORM server software are stored, furthermore, a further hard disc as the mass memory for the actual work area is connected to the first RAID controller, on which the data to be written are processed, and an internal or external bus system to a mass memory area with a second RAID controller to which a large number of mass memory units are connected on which the data to be stored are systematically loaded.

The previously described hardware system is selectively controlled by the WORM server software which provides an API (Application Programming Interface) to address the whole system. This WORM server software is run on a standard operating system.

In addition to the API the WORM server software has further essential elements in the form of a user management system in which the rights of the individual users of the API are configured, a security management system in which the security processes such as encryption, certification and integrity checks are carried out, a content management system which manages the type of storage and the composition of the content storage container (CSC) and an actual container management system which is responsible for the writing and reading operations and therefore for organising the loading of the data.

Furthermore, an administration interface is implemented in the system consisting of hardware and software, by means of which interface authorised clients can access the system and its memory via networks.

The process is essentially made up of five steps.

In a first step the configuring of the clients of the system takes place via the WORM server software in that, via the administration interface, individual "clients" in the form of other software systems to which access is to be permitted are authorised to access the memory system by the issuing of a user name and password by the administrator.

The configuring of a content storage container (CSC) is effected in a second step as also in all following steps via the WORM server software, wherein individual CSCs are loaded by the administrator. The CSC is allocated an unambiguous name. At the same time, using the current operating system, a file directory is loaded both in the work area of the second hard disc and also in the mass memory area, which may be on the same computer, but also on an NAS server or in a SAN system.

No theoretical limits are placed on the future memory sizes of the CSC. The available memory can also be expanded subsequently without influencing the flow logic.

With the production of the CSC properties such as compression rates, degree of encryption, time to elapse until the data are to be removed or deleted, time window in which the newly written data may be deleted etc., are also stored.

In the third step the data are written into the content storage container. This is effected by the individual documents, such as e-mails and scanned documents, being transferred to the system in digital form, and are optionally provided with an XML file, containing a description, and the name of the CSC in which the data are to be stored. The memory system checks the authorisation of the client and generates an unambiguous file name for the digital data to be loaded. This file name consists of the current date and the current time plus an unambiguously serial system ID for each file. The data themselves are provided with an unambiguous hash checksum and stored in the current work subdirectory of the CSC. The current directories are generated according to time criteria.

The memory system thus automatically generates a path such as:
"CSCNAME/Year/Month/DAY/Time/ . . . "—in this case the files are physically stored. After successful storage of the individual file a reference name for the file is given back to the writing party.

By means of this distributed loading process it is ensured that there is not a large number of files in one directory, which would slow down the operating system and therefore slow down the whole system.

In a fourth step a container is produced, wherein a new compressed file is produced as a container by external call-up or an automatic internal process from the large number of individual files in the work directory. Each individual file in the current work directory is first provided with an unambiguous checksum and then compressed by compression algorithms and stored in the larger container file. In a known manner this large container file can then be correspondingly loaded in encrypted form. The password is generated from the file name and a fixed system key in that an unambiguous hash value (checksum) is thereby formed. With the aid of the system key and the file name the password can be regenerated dynamically at any time. The system key is a fixed variable which is known e.g. only to the client loading the data. The container file compressed and encrypted in this way is then copied from the work area into the mass memory area of the CSC. By reason of the fact that the mass memory area is only written to once when the compressed file has been produced in the work area the mass memory is written linearly to the greatest possible extent. The read operation is therefore particularly rapid because the read/write head of the hard disc or of other disc drives can access the data linearly. At the same time, by reason of the nested directories and by the combination of individual files in a compressed container file, there is a reduction in the requirement for memory space and also in the number of physically stored files which must be addressed individually in the file system of the operating system. All these partial processes lead to optimised loading of the files being effected, this means that many small files can be stored very efficiently using a regular operating system but that there may still be very rapid access to the data. At the same time as the container file is loaded in the mass memory area an XML security file is loaded also having the same name as the container file. This security file contains the names of all individual files, which are located in the container file, and the individual unambiguous checksums of these files. By means of this additional security file an electronic signature is produced having the corresponding unambiguous checksum.

The signature and checksum are sent together with the file name to a timestamp server which can also be designed as a component of the system in the form of security hardware or security software. This, together with the official time, usually from an officially recognised time source, marks the signature and checksum and the file name of the security file. This is then stored together with the security file. No changes can therefore then be made to the data without this being noticeable when the data are read.

Although the memory system prevents the physical writing to already produced data by means of software write protection, internal attackers such as administrators could still attempt to manipulate the data via the operating system. This becomes impossible with the above-mentioned protection mechanism. In order to produce an authentic data container a valid timestamp must be produced. However, this is issued only with the current time and cannot be produced retrospectively.

The reading of data and the integrity check are carried out in a fifth step.

In order to read already stored data the reading client requires only the system ID of the file, the valid system key and corresponding access authorisations. Using the system ID the memory system finds the date on which the file was produced. The information showing in which container file and in which directory the data have been loaded is unambiguously allocated thereto.

This compressed file and the appertaining security file are accessed.

The checksums and signatures are checked for validity. If the integrity of the compressed file is established the corresponding file with the system ID is unpacked and presented to the reading client.

The stored compressed files are regularly checked for their integrity by an ongoing background process. If irregularities are found alarm mechanisms are immediately actuated. The process is also documented on the system in a log file.

The advantages of the invention are found in particular in the fact that a large number of small files are securely stored and a high reading and writing speed is ensured using currently available operating systems such as Windows or Linux in unmodified form. Under consideration of the hardware architecture which can also be produced using currently available components an economical and legally secure and applicable WORM memory for documents based on standard PC architecture elements is produced.

By means of special memory mechanisms and security processes the process ensures flexible, secure and rapid storage of the contents, in particular even of many small documents, in an economical technical architecture based on hard discs or other re-writable mass memory media. The main emphasis is placed on the use of standard components such as available operating systems and hardware, whereby an economical solution is provided.

DESCRIPTION OF THE PREFERRED EMBODIMENTS

Figure 1:
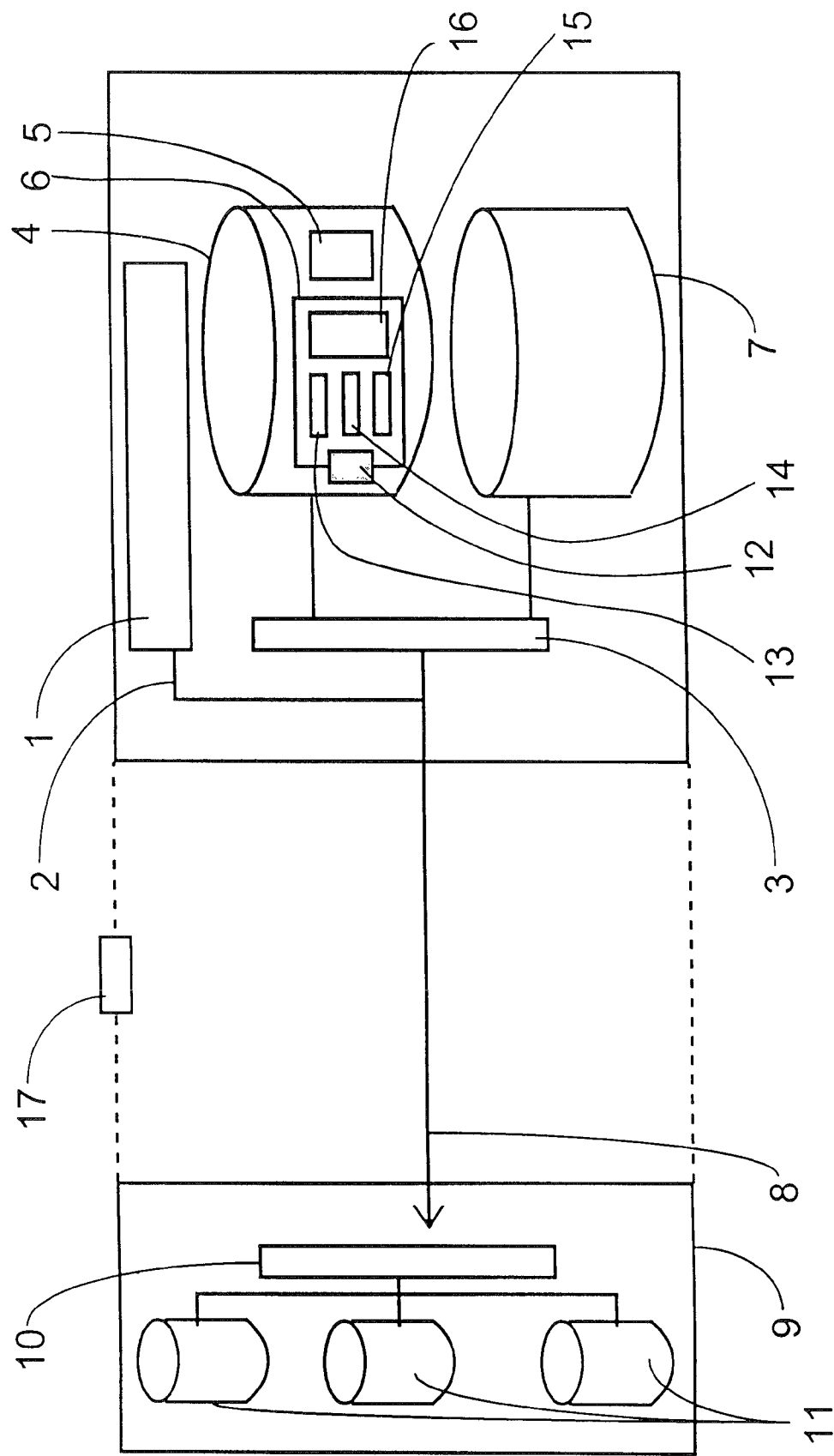
FIG. 1 is a view showing the rapid archivable WORM Memory System based on a hard disk, in accordance with the present invention.

The essential elements of the system and their connections are shown in FIG. 1.

The system configuration consists of a CPU 1 having one or a plurality of processors and the necessary further elements, which are not illustrated here or included in the description, of a PC such as RAM, DMA, etc., a bus system 2 between the CPU 1 and a first RAID controller 3 which is connected to a mass memory in the form of a first hard disc 4, on which an operating system 5 and WORM server software 6 are stored, and a second hard disc 7 as a mass memory on which the work area for processing the individual files to be written is located, and a further internal or external bus system 8 as a connection to a mass memory area 9 with a second RAID controller 10 to which a large number of mass memory units 11 are connected on which the data to be stored are systematically loaded on which the container files to be stored are loaded.

The hardware system is controlled selectively by the WORM server software 6 which makes available an API 12 for addressing the whole system.

As essential elements the WORM server software 6 has, in addition to the API 12, a user management system 13 in which the rights of the individual API users are configured, a security management system 14 in which the security processes such as encryption, certification and integrity checks are carried out, a content management system 15 which manages the type of storage and the composition of the content storage container, and an actual container management system 16 which is responsible for the writing and reading operations and therefore for organising the loading of the data.

An administration interface 17 for access and admission by authorised clients is implemented in the system.

REFERENCE NUMERALS USED

1 CPU
2 bus system
3 first RAID controller
4 first hard disc
5 operating system
6 WORM server software
7 second hard disc
8 further bus system
9 mass memory area
10 second RAID controller
11 mass memory units
12 API
13 user management system
14 security management system
15 content management system
16 container management system
17 administration interface

The invention claimed is:

1. Process for rapid writing and reading of small files for WORM data storage which preserves evidential integrity using known operating systems and a system consisting of conventional hardware with authorised access of clients, comprising:
on a first hard disc (4) an operating system (5) and also WORM server software (6), with an API (12), are located and a second hard disc (7) serves as a work area and cache and the secured data are loaded onto mass memory units (11) in content storage containers (CSCs), in a plurality of steps using the WORM server software (6) the number of files is reduced and secure storage is effected, wherein
in a first step a client is configured, to whom corresponding rights are allocated in the system;
in a second step a CSC is loaded, to which an unambiguous name is allocated, at the same time a file directory is produced in the work area of the second hard disc (7) and in the mass memory area (9) and corresponding properties are allocated to the CSC, which are secured when using the CSCs by the WORM server software (6);
in a third step the data are written into the CSC via the API (12) in that the individual documents are transferred to the system in digital form, and are optionally provided with an XML file, containing a description, and with the name of the CSC in which the data are to be stored, the WORM server software (6) checks the authorisation of the user and generates an unambiguous file name for the digital data to be loaded, these data themselves are provided with an unambiguous checksum and stored in the current work subdirectory of the CSC, wherein the current directories are generated according to time criteria, the files are physically stored therein and after successful storage of the individual file a reference name for the file is given back to the writing party;
in a fourth step a container is produced, wherein a new compressed file is produced as a container by external call-up or an automatic internal process from the large number of individual files in the work directory, in that each individual file in the current work directory is first provided with an unambiguous checksum and then compressed by compression algorithms and stored in the larger container file which can be loaded in encrypted form, the larger container file compressed and encrypted in this way, embodying a bulk encryption of said large number of individual files, which bulk encryption is then copied from the work area into the mass memory area (9) of the CSC, wherein at the same time as the larger container file embodying the bulk encryption is loaded in the mass memory area (9) an XML security file is loaded having the same name as the larger container file embodying the bulk encryption, wherein this security file contains the names of all of the individual files, which are located in the larger container file, and the individual unambiguous checksums of these individual files, by means of this additional security file an electronic signature is produced having the corresponding unambiguous checksum, the signature and checksum are sent together with the file name to a timestamp server, this, together with the official time, usually from an officially recognised time source, marks the signature and checksum and the file name of the security file, which is then stored together with the security file and
the reading of data and the integrity check are carried out in a fifth step, wherein the reading client requires only the system ID of the individual file, the valid system key and corresponding access authorisations, the checksums and signatures are checked for validity, if the integrity of the compressed individual file is established the corresponding individual file with the system ID is unpacked and presented to the reading client.

2. Process as claimed in claim 1, characterized in that the access of the client to the memory system is authorised by means of a user name and password issued by the administrator.

3. Process as claimed in claim 1, characterized in that the individual CSCs are loaded by the administrator.

4. Process as claimed in claim 1, characterized in that, with the production of the CSC, its properties including compression rates, degree of encryption, time until the data are to be removed or deleted, time window in which the newly written data may be deleted etc., are stored.

5. Process as claimed in claim 1, characterized in that the file directory can be loaded both in the work area of the second hard disc (7) and also in the mass memory area (9), which may both be on the same computer, but also on an NAS server or in a SAN system.

6. Process as claimed in claim 1, characterized in that the file name for the digital data to be loaded consists of the current date and the current time plus an unambiguously serial system ID.

7. Process as claimed in claim 1, characterized in that the memory system automatically generates a path: "CSCNAME/Year/Month/DAY/Time/ . . . ".

8. Process as claimed in claim 1, characterized in that using the system ID the memory system finds the date on which the file was produced, and the information showing in which container file and in which directory the data have been loaded is unambiguously allocated thereto, this compressed file and the appertaining security file are accessed.

9. Process as claimed in claim 1, characterized in that a password for access to the file is formed from the file name and a fixed system key and the hash value which is unambiguous in respect thereof, wherein with the aid of the system key and the file name the password can be regenerated dynamically at any time, and the system key is a fixed variable which is known e.g. only to the client loading the data.

10. Process as claimed in claim 1, characterized in that the stored compressed files are regularly checked for their integrity by an ongoing background process, and if irregularities are found alarm mechanisms are immediately actuated, wherein the process is documented on the system in a log file.

11. Process as claimed in claim 1, characterised in that the timestamp server in the form of security hardware is a component of the system.

12. Process as claimed in claim 1, characterised in that the timestamp server in the form of security software is a component of the system.

* * * * *